United States Patent
Imagawa

(10) Patent No.: US 7,609,937 B2
(45) Date of Patent: Oct. 27, 2009

(54) RECORDING APPARATUS FOR RECORDING SOUND AND IMAGE ON A RECORDING MEDIUM

(75) Inventor: Makoto Imagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 774 days.

(21) Appl. No.: 11/123,177

(22) Filed: May 6, 2005

(65) Prior Publication Data

US 2005/0254777 A1 Nov. 17, 2005

(30) Foreign Application Priority Data

May 12, 2004 (JP) ............ P2004-142590

(51) Int. Cl.
*H04N 5/76* (2006.01)
(52) U.S. Cl. .......................... 386/46; 386/70
(58) Field of Classification Search ............ 386/46, 386/68–70, 92, 120, 125–126
See application file for complete search history.

(56) References Cited

U.S. PATENT DOCUMENTS 5,029,013 A * 7/1991 Hiratsuka et al. ............ 386/64

2001/0012445 A1 * 8/2001 Kitazawa et al. ............ 386/117

FOREIGN PATENT DOCUMENTS

| JP | 52-141514 | 11/1977 |
| JP | 11-313277 | 11/1999 |
| JP | 2000-316134 | 11/2000 |
| JP | 2002-064776 | 2/2002 |
| JP | 2002-084492 | 3/2002 |

* cited by examiner

*Primary Examiner*—David E Harvey
(74) *Attorney, Agent, or Firm*—Morgan, Lewis & Bockius LLP

(57) ABSTRACT

A recording apparatus repeatedly records an image received by a tuner such that a reproduction time reaches a predetermined time, when any key provided on an operating portion or a remote control device is continuously pressed for a constant time during recording. Therefore, when a program is recorded on a recording medium, a user continuously operates any key provided on the operating portion or the remote control device, to thereby put a section on the program. As a result, the user can simply confirm the section of the program recorded on the DVD when reproducing.

4 Claims, 4 Drawing Sheets

RECORDING APPARATUS FOR RECORDING SOUND AND IMAGE ON A RECORDING MEDIUM

BACKGROUND OF THE INVENTION

1. Field of the Invention

The present invention relates to a recording apparatus which records a sound or an image on a recording medium such as a DVD, a videotape, or the like.

2. Description of the Related Art

Generally, recording apparatuses which record a video or a sound in recording mediums such as DVDs, videotapes, or the like have been spread. There is a case in which a user records a plurality of contents in one recording medium. For example, in JP-A-2002-84492, a recording apparatus in which, when a recording medium on which the plurality of contents are recorded is reproduced, initial image data from a block of motion picture data is employed as a thumbnail image to confirm the contents is disclosed. According to this configuration, the contents recorded on the recording medium can be confirmed. In addition, since the employed thumbnail image and motion picture data are recorded in correlating with each other, the content of motion picture data recorded on the recording medium can be confirmed by confirming the thumbnail image.

In addition, in JP-A-52-141514, a recording apparatus in which, when a predetermined operation is performed, an image recorded at that time is extracted as a still image and the still image is recorded on the recording medium is disclosed.

SUMMARY OF THE INVENTION

In the recording apparatus disclosed in JP-A-2002-84492, the thumbnail image is recorded in correlating with motion picture data, such that a user can simply confirm the content (motion picture) recorded on the recording medium. However, according to this recording apparatus, there is a problem in that the user cannot confirm the section of the content recorded on the recording medium when reproducing.

In addition, by using the recording apparatus disclosed in JP-A-52-141514, the still image can be recorded on the recording medium at a recording position which is the section of the content recorded on the recording medium, so that a user can confirm the section of the content recorded on the recording medium through the still image when reproducing. However, in this case, additional operation keys must be provided to record the still image, which results in increasing the total number of the keys. Accordingly, the manufacturing cost of a main body is increased. In addition, as the number of the keys increases, a space to arrange the keys is increased. As a result, there is a problem in that the size of a remote control device or the main body increases. On the other hand, in order to reduce the size of the remote control device or the main body, if the keys are densely arranged, operationality is degraded.

It is an object of the invention to provide a recording apparatus in which a user can simply confirm a section of a recorded content on a recording medium when reproducing, without increasing a manufacturing cost or a size of a device main body and degrading operationality.

In order to achieve the above-described objects, the invention has the following configurations.

(1) According to an aspect of the invention, there is provided a recording apparatus including: a recording unit that records a sound or an image on a recording medium; an operating unit that provides a control signal with respect to a main body; and a control unit that controls an operation of each part of the main body based on the control signal provided by the operating unit; wherein when the operating unit continuously provides the control signal for a first predetermined time during recording by the recording unit, the control unit controls the recording unit to repeatedly record a predetermined image on the recording medium, such that the same image is continuously reproduced for a second predetermined time when reproducing.

According to this configuration, when the operating unit continuously provides any control signal for the first predetermined time during recording by the recording unit, the control unit controls the recording unit to repeatedly record the predetermined image on the recording medium, such that the same image is continuously reproduced for the second predetermined time when reproducing. Therefore, only if a user continuously presses any key of a remote control device or any button of the main body for the first time during recording by the recording unit, the predetermined image can be repeatedly recorded on the recording medium, such that the same image is continuously reproduced for the second predetermined time, for example, 1 to 2 seconds, when reproducing. When the recording medium is reproduced, at a position where the same image is repeatedly recorded, a video to be displayed on a television receiver or the like, which is connected to the recording apparatus, is in the same state as though the reproduction temporally stops, so that the user can simply confirm the position where the same image is repeatedly recorded on the recording medium when reproducing. Therefore, when recording the content on the recording medium, the user continuously presses any key provided on the operating unit for a constant time, to thereby put the section on the content. As a result, the user can simply confirm the section of the content recorded on the recording medium when reproducing.

In addition, the operation for repeatedly recording the same image on the recording medium is performed by continuously pressing any key provided on the operating unit for the first predetermined time. Thus, an increase in manufacturing cost or an increase in size of the remote control device or the main body can be prevented, without increasing the number of keys provided on the remote control device or the main body.

In addition, when the reproduction of the recording medium begins, even if the user continuously presses a reproduction key for the first predetermined time, the same image is not repeatedly recorded on the recording medium.

(2) When the operating unit provides the control signal during non-recording by the recording unit, the control unit may control an operation of the main body based on the control signal, without judging whether or not the control signal is continuously provided for the first predetermined time.

According to this configuration, when the operating unit provides any control signal during non-recording by the recording unit, the control unit controls the operation of the main body based on the control signal, without judging whether or not the control signal is continuously received for the first time. Therefore, the operation of the main body is suppressed from being delayed with respect to the operation of the user.

(3) When the operating unit continuously provides the control signal for the first predetermined time, the control unit may allow an image received by the main body at that time to be repeatedly recorded on the recording medium.

According to this configuration, the control unit allows the image received by the main body at that time to be repeatedly recorded on the recording medium for the second predetermined time. Therefore, the content, as well as the section of the content recorded on the recording medium, can be simply judged.

(4) The recording apparatus may further include a memory that stores still images. When the operating unit continuously provides the control signal for the first predetermined time, the control unit may control the recording unit to repeatedly record a still image selected from the still images stored in the memory on the recording medium.

According to this configuration, the image which is continuously recorded on the recording medium for the second predetermined time can be selected according to the preference of the user so as to put the section on the content recorded on the recording medium.

According to the aspect of the invention, when the user desires to record the content on the recording medium and to put the section on the content, the user continuously operates any key provided on the operating unit for the constant time, so that the video displayed on the television receiver which is connected to the recording apparatus when reproducing is in the same state as when the reproduction temporally stops. Then, the user can easily confirm the section of the content recorded on the recording medium. In addition, the operation for repeatedly recording the same image on the recording medium is performed by continuously pressing any key provided on the operating unit for the first predetermined time. Thus, the increase in manufacturing cost or the increase in size of the remote control device or the main body can be prevented, without increasing the number of keys provided on the remote control device or the main body.

DETAILED DESCRIPTION OF THE PREFFERED EMBODIMENTS

Figure 1:
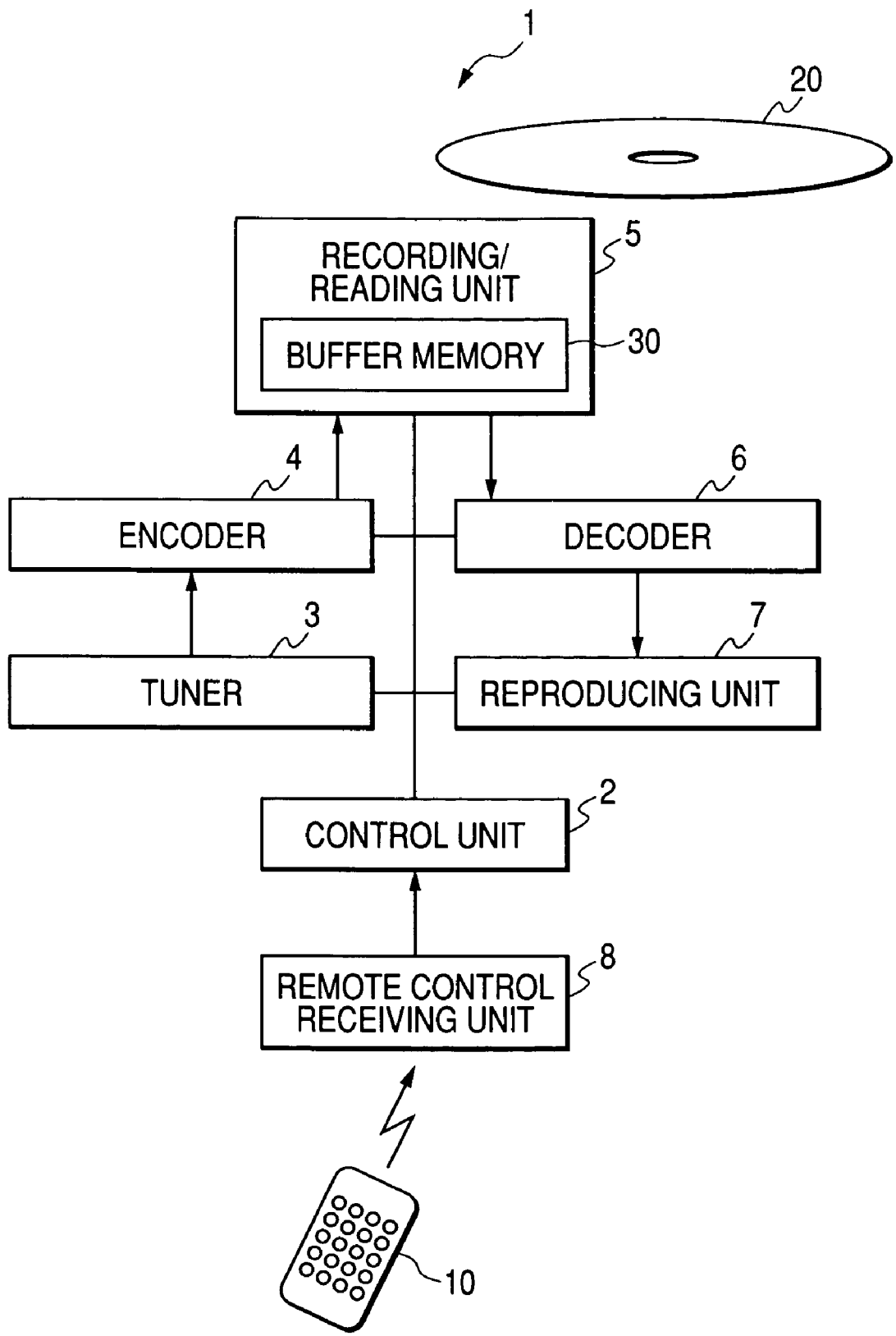
FIG. 1 is a block diagram showing a configuration of a DVD device according to an embodiment of the invention.

FIG. 1 is a block diagram showing the configuration of a DVD device according to an embodiment of the invention. A DVD device 1 according to the present embodiment of the invention has a control unit 2 that controls the operation of a main body, a tuner 3 that receives a program which is broadcasted through a selected channel, an encoder 4 that encodes a video signal and a sound signal of the program received through the tuner 3 into data (hereinafter, referred to as recording data) which is recorded on a DVD 20 set on the main body, a recording/reading unit 5 that records recording data of the program encoded by the encoder 4 on the DVD 20 set on the main body or reads data of the program recorded on the DVD 20 set on the main body, a decoder 6 that decodes data (hereinafter, referred to as reading data) read from the DVD 20 by the recording/reading unit 5, a reproducing unit 7 that generates and outputs a reproduction video signal and a reproduction sound signal (hereinafter, collectively referred to as reproduction signal) based on reading data decoded by the decoder 6, and a remote control receiving unit 8 that receives a control signal with respect to the main body transmitted from a remote control device 10.

The tuner 3 extracts a video signal and a sound signal of a program, which is broadcasted through a selected channel, from television broadcast signals inputted to the main body. The encoder 4 encodes recording data inputted from the tuner 3 and inputs recording data to the recording/reading unit 5 after compressing recording data in a frame unit. The recording/reading unit 5 has a buffer memory 30 (hereinafter, simply referred to as a buffer 30) provided therein and stores recording data inputted from the encoder 4 in the buffer 30. In addition, the recording/reading unit 5 is provided with a known pickup head or the like. Therefore, when recording, the recording/reading unit 5 irradiates a laser beam onto the DVD 20 set on the main body and records recording data stored in the buffer 30 on the DVD 20 in an order of storing time. On the other hand, when reproducing, the recording/reading unit 5 stores reading data read from the DVD 20 set on the main body in the buffer 30. In addition, when reproducing, the decoder 6 decodes reading data stored in the buffer 30 in an order of reading time from the DVD 20 and inputs reading data to the reproducing unit 7 in a frame unit. The reproducing unit 7 generates a reproduction signal based on decoded reading data and inputs the reproduction signal to a television receiver (not shown) or the like. The remote control receiver 8 receives a control signal with respect to the main body transmitted in shapes of infrared rays or electric waves from the remote control device 10.

Figure 2:
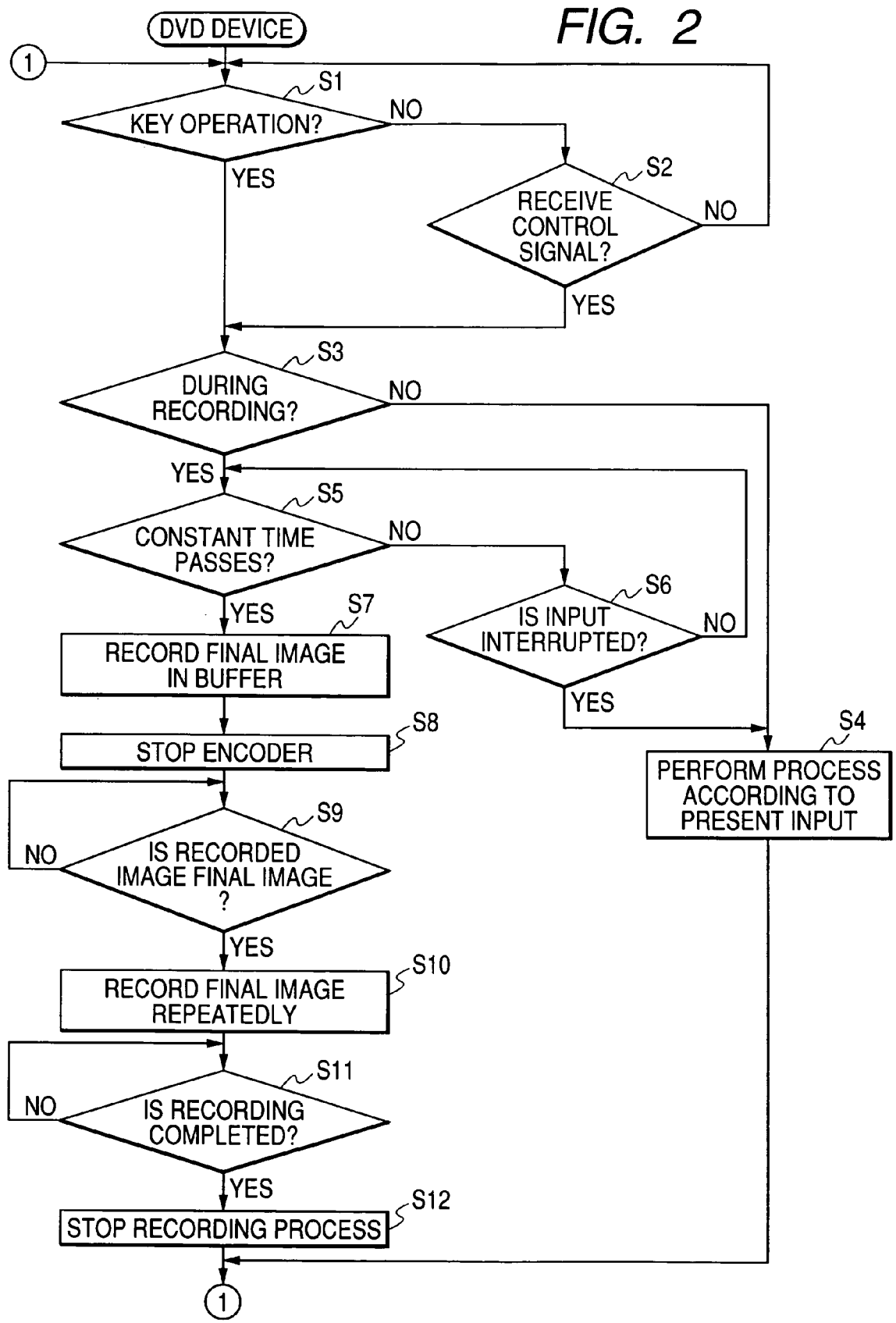
FIG. 2 is a flowchart showing an operation of the DVD device according to the embodiment of the invention.

Next, the operation of the DVD device according to the present embodiment will be described. FIG. 2 is a flowchart showing the operation of the DVD device according to the present embodiment.

First, the DVD device 1 according to the present embodiment waits until a key of an operating portion (not shown) provided in the main body is operated or until the remote control receiving unit 8 receives the control signal with respect to main body transmitted from the remote control device 10 (Steps S1 and S2). In the steps S1 and S2, the DVD device 1 waits for the input with respect to the main body. In the step S1 or the step S2, if it is judged that the input is performed with respect to the main body, the DVD device 1 judges whether or not a recording process is performed with respect to the DVD 20 (Step S3) In the step S3, if it is judged that the recording process is not performed with respect to the DVD 20, the DVD device 1 performs a process according to the key operated on the operation unit or the control signal received by the remote control receiving unit 8 (Step S4). Then, the process returns to the step S1. For example, when the main body is stopped, if the remote control receiving unit 8 receives a control signal which instructs beginning of the reproduction of the DVD 20, the DVD device 1 begins the reproduction of the DVD 20 set on the main body. In addition, when the device main body is reproducing the DVD 20, if the remote control receiving unit 8 receives the control signal which instructs stopping the reproduction of the DVD 20, the DVD device 1 stops the reproduction of the DVD 20 set on the main body.

On the other hand, in the step S3, if it is judged that the recording is performed, the DVD device 1 judges whether or not the input is continued with respect to the main body for a constant time (first predetermined time) (Steps S5 and S6). Specifically, it is judged whether or not the input stops before the constant time passes after the input is performed with respect to the main body. The user can continuously operate the operating portion or the key of the remote control device for the constant time such that the input is continued with respect to the main body for the constant time. If it is judged that the input is not continued with respect to the main body for the constant time, the DVD device 1 performs a process according to the key operated on the operating portion or the control signal received by the remote control receiving unit 8 in the step S4. Then, the process returns to the step S1. For example, when the remote control receiving unit 8 receives a control signal which instructs stopping the recording, the DVD device 1 stops the recording with respect to the DVD 20 set on the main body.

On the other hand, if it is judged that the input is continued with respect to the main body for the constant time, the encoder 4 encodes an image of a frame input at that time, the recording/reading unit 5 writes the encoded image into the buffer 30, and the DVD device 1 stops the encoder 4 (Steps S7 and S8). Therefore, when the input is continued with respect to the main body for the constant time during recording, an image finally written into the buffer memory 30 is an image received by the tuner 3 when any input is continued with respect to the main body for the constant time. Even though the encoder stops in the step S8, the recording/reading unit 5 continuously records recording data stored in the buffer 30 on the DVD 20, without immediately stopping the recording on the DVD 20.

Figure 3:
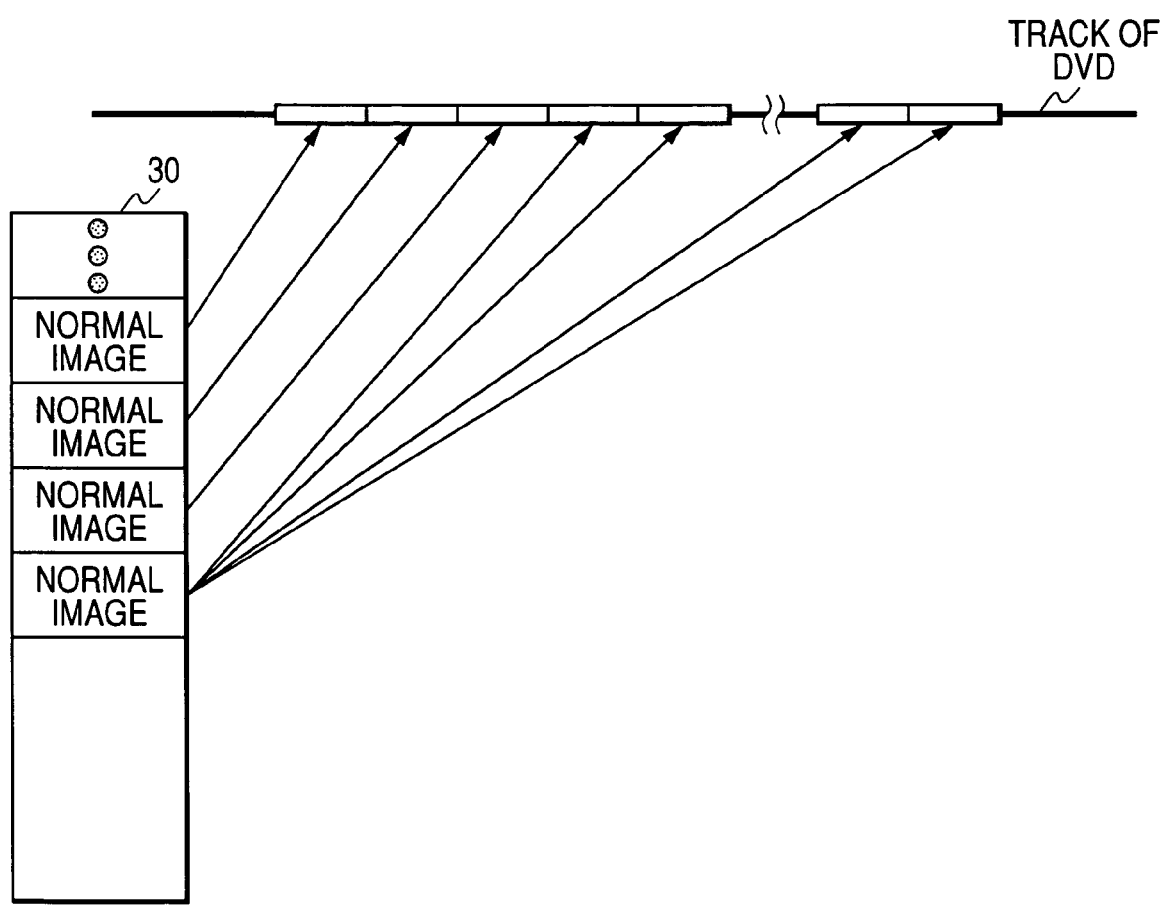
FIG. 3 is a diagram illustrating an operation for repeatedly recording the same image on a DVD such that a reproduction time reaches a predetermined time.

When recording data recorded on the DVD 20 is an image of the last one frame stored in the buffer 30 (Step S9), the DVD device 1 repeatedly records the image on the DVD 20 (Step S10). After the encoder 4 stops, the DVD device 1 records recording data stored in the buffer 30 on the DVD 20, as shown in FIG. 3. At this time, if recording data recorded on the DVD 20 is the image of the last one frame, the DVD device 1 repeatedly records this image on the DVD 20. The image of the last one frame is repeatedly recorded on the DVD 20 such that a reproduction time for which the image of the one frame is continuously reproduced reaches a predetermined time (second predetermined time), for example, 1 to 2 seconds, when reproducing.

If it is judged that the repetitive recording of the image of the last one frame is completed (Step S11), the DVD device 1 stops the recording process by the recording/reading unit 5 on the DVD 20 (S12). Then, the process returns to the step S1.

As such, in the DVD device 1 according to the present embodiment, any key provided on the operating portion or the remote control device 10 is continuously operated for the constant time during recording. Then, the image received by the tuner 3 at that time is repeatedly recorded on the DVD 20 such that the reproduction time reaches the predetermined time. Since the image repeatedly recorded on the DVD 20 is repeatedly reproduced when reproducing, a video displayed on the television receiver connected to the reproducing unit 7 is in the same state as when the reproduction temporarily stops. Therefore, the user can easily confirm a position where the same image is repeatedly recorded on the DVD 20 when reproducing. For this reason, when the program is recorded on the DVD 20, the user continuously operates any key provided on the operating portion or the remote control device 10 for the constant time, to thereby put the section on the program. Accordingly, the video displayed on the television receiver or the like connected to the reproducing unit when recording is in the same state as when the reproduction temporarily stops. As a result, the user can easily confirm the section of the program recorded on the DVD when reproducing.

In addition, the operation for repeatedly recording the same image on the recording medium is performed by continuously pressing any key provided on the remote control device 10 for a predetermined time. Thus, the increase in the manufacturing cost or the increase in size of the remote control device 10 or the device main body can be prevented, without increasing the number of keys provided on the remote control device 10 or the device main body.

In addition, as regards the device main body, during non-recording, if any input is performed with respect to the device main body, it is constructed such that the process is performed with respect to the present input, without judging whether or not the input is continued for the constant time. Therefore, the operation of the device main body can be prevented from being delayed with respect to the user operation. Moreover, during non-recording, the same image is not repeatedly recorded on the DVD 20, and thus, even when it is not judged whether or not the input is continued with respect to the main body for the constant time, any problem does not occur.

Figure 4:
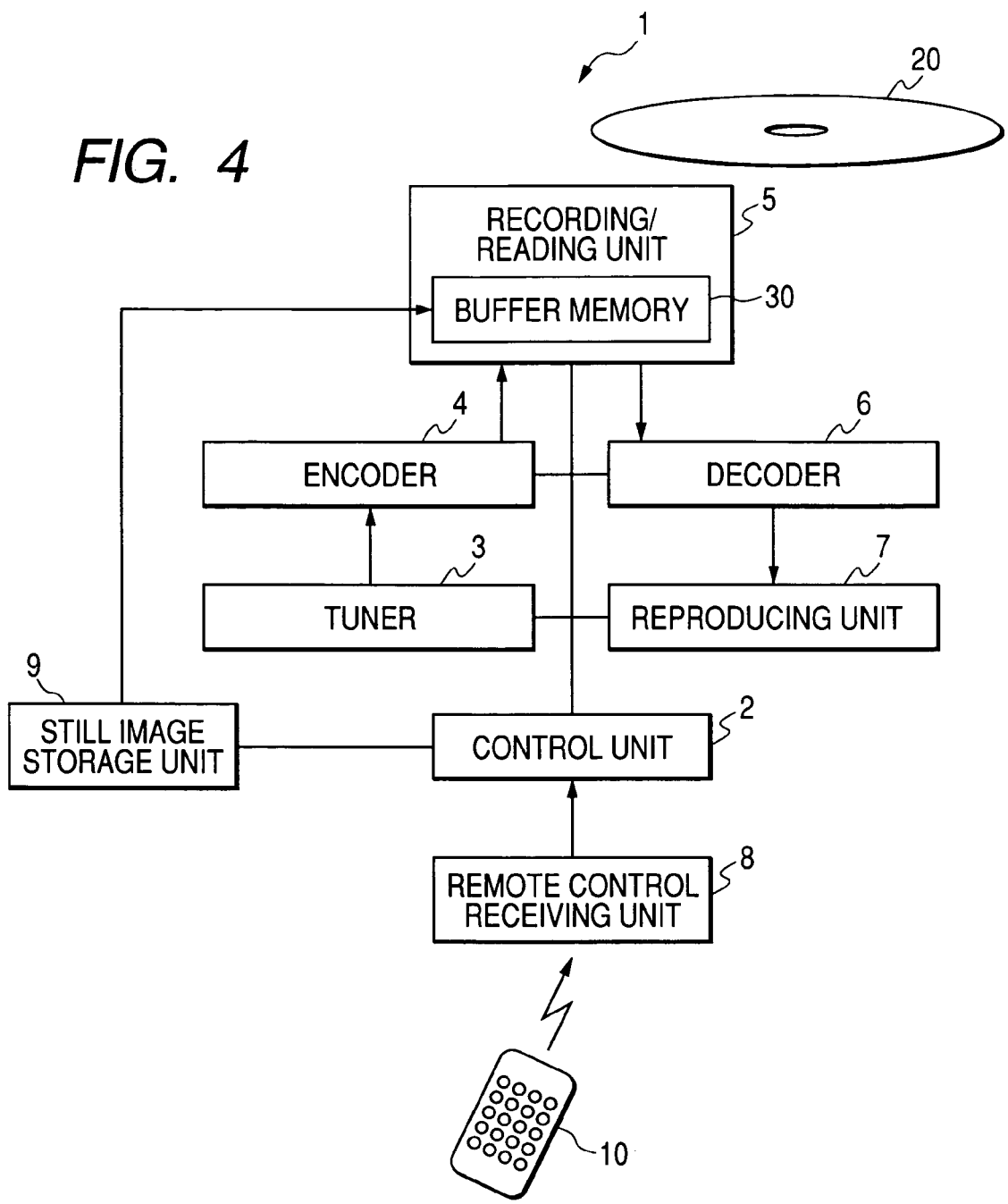
FIG. 4 is a block diagram showing a configuration of a DVD device according to another embodiment of the invention.

In addition, according to the present embodiment, when the input is continued with respect to main body for the constant time during recording, the image received by the tuner 3 at that time is repeatedly recorded on the DVD 20. As shown in FIG. 4, a still image storage unit 9 that stores a plurality of still images may be provided. In this case, when the input is continued with respect to the main body for the constant time during recording, a still image selected from the still images stored in the still image storage unit 9 may be finally recorded in the buffer 30 and the still image may be repeatedly recorded on the DVD 20. In such a manner, the section of the content recorded on the DVD 20 can be made by the still image according to the preference of the user.

Figure 5:
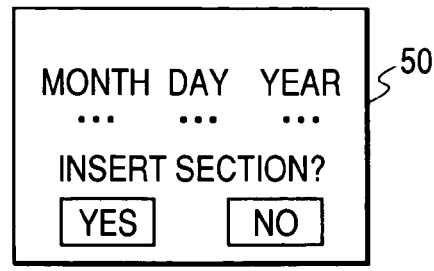
FIG. 5 is a diagram illustrating an example of a display.

Although the embodiments have been described in which the predetermined image is repeatedly recorded on the recording medium when the operating unit such as the remote control device continuously provides the control signal for the first predetermined time, the present invention is not limited to herein described. As shown in FIG. 5, on a display 50 such as a set up screen page or a timer recording set up screen, a control unit can provide a selection to the user whether he/she wishes to repeatedly record the predetermined image on the recording medium during a timer recording. In such a manner, the section of the content recorded on the DVD can be automatically inserted by the timer recording in accordance with the preference of the user.

What is claimed is:

1. A recording apparatus comprising:
    recording means for recording a sound or an image on a recording medium;
    remote control receiving means for receiving a control signal with respect to a main body transmitted from a remote control device in a wireless manner; and
    control means for controlling an operation of each part of the main body based on the control signal received by the remote control receiving means;
    wherein, when the remote control receiving means continuously receives any control signal for a first predetermined time during recording by the recording means, the control means controls the recording means to repeatedly record a predetermined image on the recording medium, such that the same image is continuously reproduced for a second predetermined time when reproducing,
    when the remote control receiving means receives any control signal during non-recording by the recording means, the control means controls an operation of the main body based on the control signal, without judging whether or not the control signal is continuously received for the first predetermined time, and
    when the remote control receiving means continuously receives any control signal for the first predetermined time, the control means allows an image received by the main body at that time to be repeatedly recorded on the recording medium.

2. A recording apparatus comprising:

a recording unit that records a sound or an image on a recording medium;

an operating unit that provides a control signal with respect to a main body; and a control unit that controls an operation of each part of the main body based on the control signal provided by the operating unit;

wherein when the operating unit continuously provides the control signal for a first predetermined time during recording by the recording unit, the control unit controls the recording unit to repeatedly record a predetermined image on the recording medium, such that the same image is continuously reproduced for a second predetermined time when reproducing, and when the operating unit provides the control signal during non-recording by the recording unit, the control unit controls the operation of the main body based on the control signal, without judging whether or not the control signal is continuously provided for the first predetermined time.

3. The recording apparatus according to claim 2, wherein when the operating unit continuously provides the control signal for the first predetermined time, the control unit allows an image received by the main body at that time to be repeatedly recorded on the recording medium.

4. The recording apparatus according to claim 2, further comprising:

a memory that stores still images, wherein when the operating unit continuously provides the control signal for the first predetermined time, the control unit controls the recording unit to repeatedly record a still image selected from the still images stored in the memory on the recording medium.

* * * * *